Jan. 7, 1941.  C. S. STEPHANO  2,228,129
FILTER
Filed March 24, 1939
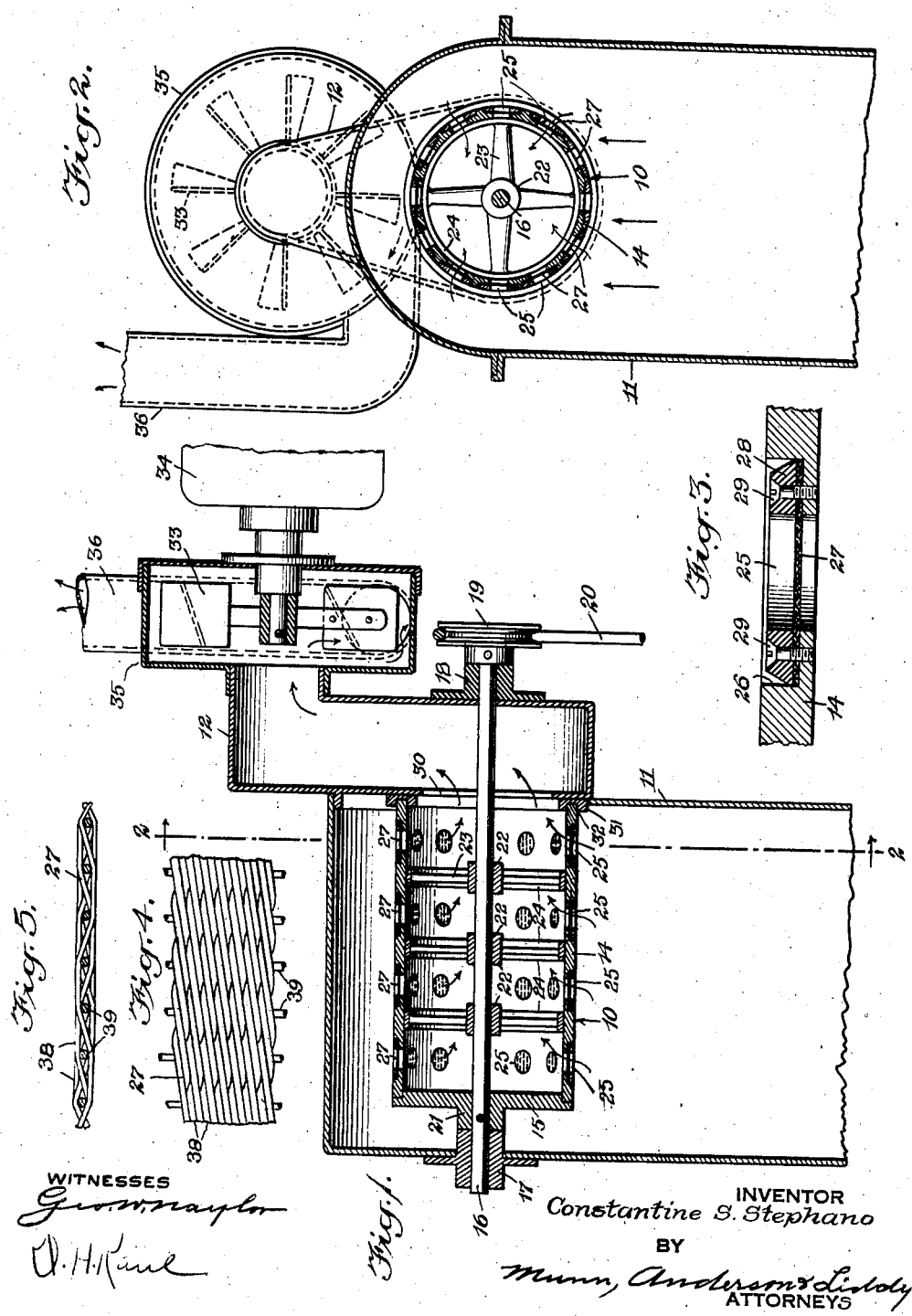
INVENTOR
Constantine S. Stephano
BY
ATTORNEYS Patented Jan. 7, 1941

2,228,129

UNITED STATES PATENT OFFICE 2,228,129

FILTER

Constantine S. Stephano, Elkins Park, Pa., assignor to Stephano Brothers, Philadelphia, Pa., a corporation of Pennsylvania Application March 24, 1939, Serial No. 263,875

2 Claims. (Cl. 183—63)

This invention relates to an improved filter and more particularly to a fluid filter which is designed primarily for separating undesired solid particles from gases.

It is an object of this invention to provide an improved filter which not only can be used for separating relatively large solid particles from gases but also may be operated so as to eliminate finely divided solid particles from gases, and which, furthermore, is selective in character and can be accurately adjusted and operated to meet varying conditions.

It is a further object of the invention to provide an improved filter which employs both mechanical screening or filtering and centrifugal force in the elimination of solid particles from gases.

Another object is the provision of an improved filter which is rotated at a relatively high rate of speed so that sufficient centrifugal force is created to obtain the desired filtering or purifying action, and which is so constructed as to withstand the strains and stresses to which it is subject during high speed operation.

My invention contemplates the provision of a filtering drum having porous portions formed in the periphery thereof through which the gas is circulated. The drum is rotated at a relatively high rate of speed, with the result that when a gas is circulated through the porous portions of the drum it is purified not only by the mechanical filtering action of the porous portions but also by centrifugal action.

In the accompanying drawing:

Figure 1 is a longitudinal sectional view through a filter and its associated connecting mechanism embodying my invention;

Fig. 2 is an elevation partially in section in the direction of the arrows on the line 2—2 of Figure 1;

Fig. 3 is a detailed view in section showing one type of construction for the porous portions of the drum, and Figs. 4 and 5 are a plan view and a longitudinal sectional view respectively, of one type of filtering or porous material that may be employed in the porous portions.

My improved filter comprises a hollow drum 10 which may be mounted in any desired location, as for instance in a conduit 11, and which preferably comprises a cylindrical shell or tube 14 which is closed at one end as by means of a cap 15 and is preferably open at the opposite end so that the interior of the drum communicates with the conduit 12.

As previously stated, the operation of my filter depends at least partly upon centrifugal force and to create the necessary centrifugal force the drum must be rotated at a relatively high rate of speed. To withstand the strains and stresses resulting from high speed rotation, the drum is preferably made of a strong metal such as steel, bronze or the like. The cap 15 is preferably formed in stepped relationship in the manner shown, so that at least a portion thereof engages the interior of the shell.

So as to provide for the rotation of the drum it is mounted on a shaft 16 which is supported in a suitable manner as by the bearings 17 and 18 which in the present instance are mounted on the conduits 11 and 12 respectively. It will be appreciated however, that the bearings 17 and 18 may be supported in any desired manner. Suitable driving connection is provided for the shaft as for instance the pulley 19, keyed to the end thereof and connected by means of a drive belt 20 to a motor (not shown). The shaft 16 extends through and is keyed to a sleeve or collar 21 provided in the cap 15 of the drum, it being appreciated that the shaft forms tight engagement with the sleeve or collar so as to prevent leakage of gas at this point.

Where the drum is of relatively great length as shown in the drawing, it is preferably mounted or supported on the shaft by supplemental supports. The supplemental supports preferably comprise sleeves 22 disposed around the shaft and which may be keyed thereto, and which are connected as by means of spokes or arms 23 to the bands 24 which engage and preferably are connected to the inner surface of the drum.

The periphery of the drum is provided with one or more porous portions through which the air or other gas to be filtered is circulated. The porous portions are preferably formed by providing a plurality of openings in the periphery and securing fine mesh porous filters over the openings. I have found that the desired results are obtained by providing circular openings 25 in equally spaced relationship around the periphery of the drum. The openings should be arranged in rows as shown in the drawing and in a drum of the particular construction illustrated four rows are provided which are spaced intermediate the bands 24 and intermediate the two outer bands and the respective ends of the drum as shown. Each of the openings 25 is provided with a stepped ledge 26 around the periphery thereof and a circular fine mesh wire filter 27 is firmly attached thereto as by means of a ring or washer 28 held in position by means of suitable strong fastening means such as machine screws 29 which are threaded into the drum.

The type of porous material employed over the openings 25 may be varied but satisfactory results are obtained by employing a fine mesh woven wire fabric preferably made of a corrosion-resisting material such as Monel metal, stainless steel or the like. A woven wire fabric of this character is illustrated in detail in Figs. 4 and 5, and it comprises the warp strands 38 interwoven with the filler or woof strands 39 in a well-known manner.

In using my improved filter the drum is rotated at a high rate of speed and the gas which is to be purified or filtered is drawn through the screened openings 25 into the interior of the drum and thence may be led out through the conduit 12 to the point where it is desired to use the gas.

In order to prevent undesirable solid particles from leaking into the drum 10 or conduit 12 at the open end of the drum, the conduit 12 should be provided with sealing engagement with the end of the drum. This may be accomplished by providing the conduit 12 with an opening 30 which communicates with the interior of the drum and with a sealing ring 31 attached to the outer surface of the conduit and provided with a groove or track 32 which accommodates the end of the drum, forming tight engagement therewith but at the same time permitting rotation of the drum.

The air or other gas may be caused to circulate through the screened openings 25 as indicated by the arrows, by means of an exhaust fan 33 which is driven by suitable means such as motor 34, and which is positioned in a housing 35 attached to the end of the conduit 12. An outlet conduit 36 may lead from the housing 35 to a place where it is desired to use the gas.

In operation, the motor 34 is energized so as to cause exhaust fan 33 to draw gas from conduit 11 through the screened openings 25 into the interior of the drum and thence through conduit 12 and housing 35 outwardly through conduit 36. At the same time the drum 10 is caused to rotate by means of shaft 16, pulley 19 and the driving mechanism. Thus the gas passing through the woven wire fabric or other porous material is subjected not only to a mechanical filtering action but also to a centrifugal filtering action. The woven wire fabric, or rather, porous material, permits the passage of gases and also of very finely divided solid particles. The larger solid particles will be prevented from passing through the fabric or other porous material by the mechanical screening action of the porous material. The very finely divided particles which ordinarily pass through the woven wire fabric or other porous material will contact one or more of the strands as it seeks to pass through the material, with the result that centrifugal force will cause it to rebound radially outwardly away from the drum.

So as to insure the desired action the speed of rotation of the drum should be governed or determined by (a) the force or suction with which the gases are drawn through the woven wire fabric or other porous material, and (b) the mass of the undesired particles which it is desired to eliminate. It will be appreciated that when the mass of the particles which it is desired to eliminate is small and when the force or suction of the gas is large the speed of rotation of the drum must be increased, whereas when the mass of the particles is relatively large and the force or suction of the gas is relatively small the speed of rotation may be decreased. Thus there is a proportional relationship between the speed of rotation and the force or suction of the gas, and there is an inverse relationship between the speed of rotation and the mass of the particles.

It will be appreciated that my improved filter may be used in any desired location where it is desired to eliminate solid particles from gases. It should also be appreciated that in the accompanying drawing I have merely illustrated one preferred embodiment of my invention and that many modifications may be made in the construction without departing from the invention as set forth in the accompanying claims.

I claim:

1. A filter for eliminating undesired solid particles from gases comprising a hollow drum having a plurality of circumferentially disposed openings, a screen located within each opening, means for drawing gases through the screens, means revolving the drum, the screens in each opening being located substantially midway between the inner and outer walls of the drum and providing an exterior annular shoulder at each opening for cutting through the incoming gases and for deflecting the particles away from the gas stream.

2. A filter for eliminating undesired solid particles from gases comprising a hollow drum having a plurality of circumferentially disposed openings, a screen located within each opening, a suction fan for drawing gases through the screens and drum, means revolving the fan, means revolving the drum independently of the fan so that the fan and drum may be revolved at different speeds depending upon the type of solid particles in the gas, the screens in each opening being located substantially midway between the inner and outer walls of the drum and providing an exterior annular shoulder at each opening for cutting through the incoming gases and for deflecting the solid particles away from the gas stream.

CONSTANTINE S. STEPHANO.